US008658742B2

(12) United States Patent
Dombrowski et al.

(10) Patent No.: US 8,658,742 B2
(45) Date of Patent: Feb. 25, 2014

(54) EPOXY RESIN IMBIBED POLYMER PARTICLES

(75) Inventors: Gary William Dombrowski, West Chester, PA (US); Zhenwen Fu, Lansdale, PA (US); Caroline Slone, Ambler, PA (US); Andrew Swartz, Fleetwood, PA (US)

(73) Assignee: Rohm and Haas Company, Philadelphia, PA (US)

( * ) Notice: Subject to any disclaimer, the term of this patent is extended or adjusted under 35 U.S.C. 154(b) by 21 days.

(21) Appl. No.: 13/457,972

(22) Filed: Apr. 27, 2012

(65) Prior Publication Data
US 2012/0301621 A1 Nov. 29, 2012

Related U.S. Application Data

(60) Provisional application No. 61/490,382, filed on May 26, 2011.

(51) Int. Cl.
*C08G 65/32* (2006.01)
*C08G 67/00* (2006.01)
*B05D 3/02* (2006.01)
*C09D 5/44* (2006.01)
*C08L 63/00* (2006.01)

(52) U.S. Cl.
USPC ........... 525/403; 525/407; 525/408; 427/386; 523/412; 523/403

(58) Field of Classification Search
USPC ........... 525/403, 407, 408; 427/386; 523/412, 523/403
See application file for complete search history.

(56) References Cited

U.S. PATENT DOCUMENTS

| 4,314,004 | A | * | 2/1982 | Stoneberg | ............. 428/421 |
|---|---|---|---|---|---|
| 4,522,962 | A | | 6/1985 | Abbey et al. | |
| 6,235,811 | B1 | | 5/2001 | Robeson et al. | |
| 6,277,910 | B1 | | 8/2001 | Rassing et al. | |
| 2010/0298483 | A1 | | 11/2010 | Allen et al. | |

FOREIGN PATENT DOCUMENTS

| EP | 1059334 A2 | 12/2000 |
|---|---|---|
| EP | 2189502 A1 | 9/2008 |
| WO | 2007112508 A1 | 10/2007 |

OTHER PUBLICATIONS

Young, Glenda C., "Modifying Latex Emulsions With Epoxy Resin Dispersions", Adhesives Age, Sep. 1996, vol. 39.10, pp. 24-27.*

* cited by examiner

*Primary Examiner* — William Cheung
(74) *Attorney, Agent, or Firm* — Reid S. Willis

(57) ABSTRACT

The present invention relates to a stable aqueous dispersion of thermoplastic polymer particles imbibed with a thermosettable compound. The polymer particles are characterized by having a sufficient concentration of anti-agglomerating functional groups to stabilize the latex against agglomeration. The dispersion is useful as one part of a two-pack formulation.

13 Claims, No Drawings

EPOXY RESIN IMBIBED POLYMER PARTICLES

BACKGROUND OF THE INVENTION

Polymer latexes are typically stabilized by external anionic surfactants. Stability is often further enhanced by the inclusion of structural units in the polymer of carboxylic acid or carboxylate groups arising from the polymerization of monomers such as acrylic acid, methacrylic acid, and itaconic acid and salts thereof. Although the use of these acid-containing monomers is considered essential for commercial preparation of latexes, finding the optimal concentration is critical: Too much acid monomer results in film blistering, increased associative thickener demand, and poor resistance to hydrophilic solvents. Too little causes instability of the latex. As such, latexes commonly used in industrial applications contain the least amount of acid monomer necessary to impart stability to the particles.

Young has reported that incorporating epoxy resins into latex particles improves "handling performance and wet and chemical strength advantages over unmodified latex formulations" while reducing or even eliminating the need for volatile organic compounds (VOCs). (Young, G. C., "Modifying Latex Emulsions with Epoxy Resin Dispersions", *Adhesives Age*, pp. 24-27, (1996)). Nevertheless, the stabilizing advantages of carboxylic acid salts are offset by their reactivity toward these thermosettable compounds. However, the reactivity of these thermosettable compounds with carboxylate salts causes latex particle instability. Young suggests that the reactivity of the acid group can be suppressed by lowering the pH of the polymer prior introduction of the epoxy resin; however, a skilled artisan would recognize that colloidal stability of the latex would be compromised at low pH. Significantly, Young only teaches that up to 20% of the epoxy resin can be incorporated into the latex particle (with examples only up to 10% incorporation) and makes no mention of the percent solids of the latex with incorporated epoxy resin.

Consequently, it remains a challenge to imbibe more than 10% of a thermosettable compound into a high-solids (40-60 weight percent) polymer particle dispersion and maintain particle stability under standard industry protocols, namely heat-age stability testing. It would therefore be an advance in the art to discover a heat-age stable curable latex 2-pack system that allows for the incorporation of relatively high concentrations of a thermosettable compound.

SUMMARY OF THE INVENTION

In a first aspect, the present invention is a composition comprising a stable aqueous dispersion of thermoplastic polymer particles imbibed with a thermosettable compound having at least two oxirane groups, which polymer particles are characterized by having a sufficient concentration of anti-agglomerating functional groups to stabilize the latex against agglomeration, wherein the composition contains a substantial absence of a hardener.

In a second aspect, the present invention relates to a method for forming a cured composite comprising the steps of a) contacting the composition of any of Claims 1 to 7 with a hardener to form a curable composition b) applying the curable composition to a substrate; and c) curing the applied composition, wherein the steps a) and b) are sequential or comcomitant.

In a third aspect, the present invention is a method comprising the steps of:

a) polymerizing an aqueous dispersion of an ethylenically unsaturated monomer containing anti-agglomerating groups under conditions sufficient to form a stable aqueous dispersion of an anti-agglomerating group functionalized polymer; and b) mixing the anti-agglomerating group functionalized polymer with a thermosettable compound having at least two oxirane groups to form a stable aqueous dispersion of imbibed polymer particles having a weight average particle size in the range of 50 to 400 nm which is heat-age stable at 60° C. for 10 days.

The present invention addresses a need in the art by providing a heat-age stable polymer latex imbibed with sufficient levels of a low molecular weight thermosettable compound to form a composition that provides a useful coating, adhesive, sealant, primer, caulk, or filler.

DETAILED DESCRIPTION OF THE INVENTION

In a first aspect, the present invention is a composition comprising a stable aqueous dispersion of thermoplastic polymer particles imbibed with a thermosettable compound having at least two oxirane groups, which polymer particles are characterized by having a sufficient concentration of anti-agglomerating functional groups to stabilize the latex against agglomeration, wherein the composition contains a substantial absence of a hardener.

The imbibed thermosettable compound preferably has a multiplicity of oxirane groups; more preferably, the thermosettable compound is a novolac resin, a di-, tri- or tetraglycidyl ether or a di-, or tri- or tetraglycidyl ester.

Examples of suitable thermosettable compounds include the diglycidyl ether of bisphenol A, the diglycidyl ether of bisphenol F, 1,4-butanediol diglycidyl ether, 1,6-hexanediol diglycidyl ether, the diglycidyl ester of phthalic acid, 1,4-cyclohexanedmethanol diglycidyl ether, 1,3-cyclohexanedmethanol diglycidyl ether, the diglycidyl ester of hexahydrophthalic acid, and novolac resins, and combinations thereof. A commercially available thermosettable compound is D.E.R.™ 331 Liquid Epoxy Resin (a Trademark of The Dow Chemical Company or its Affiliates).

Aqueous dispersions of the thermoplastic polymer particles can be achieved through free radical emulsion or suspension addition polymerization or by dispersion of a preformed polymer under shear into an aqueous medium. Examples of suitable latexes include acrylic, styrene-acrylic, styrene-butadiene, urethane, ester, olefin, vinyl chloride, ethylene vinyl acetate, and polyvinyl acetate based latexes, with acrylic and styrene-acrylic latexes being preferred.

The thermoplastic polymer particles are further characterized by containing anti-agglomerating functional groups, which refer to hydrophilic groups that are sufficiently unreactive with the oxirane groups (and ester groups, if present) such that the latex particles are heat-age stable at 60° C. for 10 days. The term "heat-age stable at 60° C. for 10 days" is used herein to mean that the particle size of a latex subjected to heat-aging at 60° C. for 10 days stability does not increase by more than 30% beyond the particle size before such heat-age studies.

Anti-agglomerating functional groups can be incorporated into the polymer particles using monomers containing anti-agglomerating functional groups (anti-agglomerating monomers), although it would also be possible to incorporate such groups by grafting. The anti-agglomerating groups are believed to be effective because they are hydrophilic as well as non-reactive with oxirane groups under heat-age conditions. The general class of such groups includes amide groups, acetoacetoxy groups, and strong protic acids, which are pH adjusted to form their conjugate bases.

Specific examples of anti-agglomerating monomers include acrylamide, phosphoethyl methacrylate, sodium styrene sulfonate, acetoacetoxyethyl methacrylate, and acrylamido-methyl-propane sulfonate. The corresponding anti-agglomerating functional groups formed from these monomers (also referred to as structural units) are illustrated below:

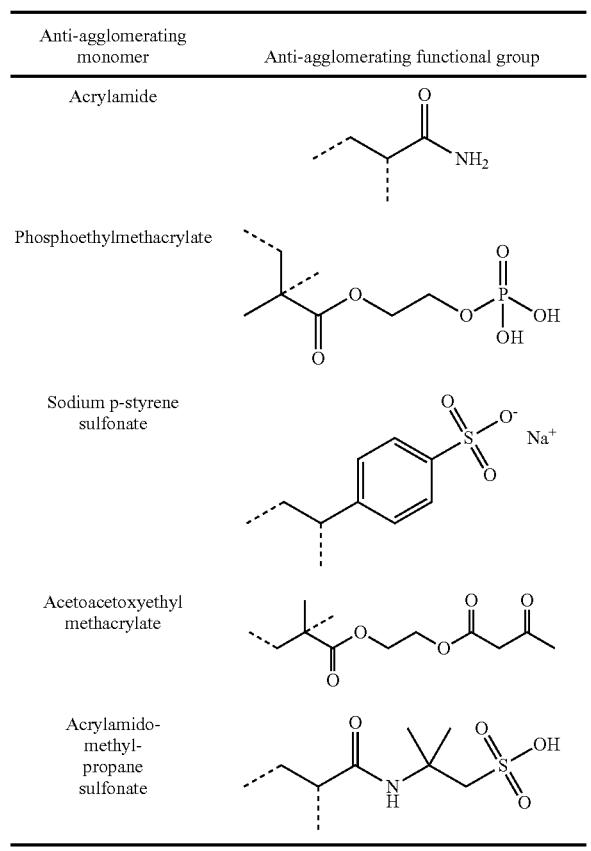

The dotted lines refer to the points of attachment of the anti-agglomerating functional monomer to the polymer. It should be noted that the phosphoethylmethacrylate and acrylamido-methyl-propane sulfonate groups are preferably predominantly present in their conjugate base form (i.e., salt form). AAEM is more stable as its enamine, which can be prepared post-polymerization by reacting the polymer with preferably a stoichiometric amount of a primary amine (R—NH$_2$) or ammonia, where R is H or an alkyl group:

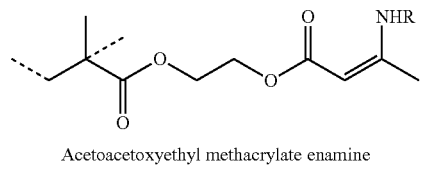

Acetoacetoxyethyl methacrylate enamine

Although carboxylic acid containing monomers are not anti-agglomerating, it has surprisingly been discovered that carboxylic acid groups can be incorporated into the polymer particles provided the polymer contains sufficient levels of anti-agglomerating groups and the pH is sufficiently high to maintain latex stability under heat-age conditions.

Although not bound by theory, it is believed that anti-agglomerating groups are effective in stabilizing the polymer because the groups are both hydrophilic and non-reactive toward epoxy groups under heat-age conditions. Where the anti-agglomerating groups arise from monomers containing strong acid functionality (phosphoethyl methacrylate, sodium styrene sulfonate, and acrylamido-methyl-propane sulfonate), it has been discovered that colloidal and heat-age stability is achieved by adjusting the pH of the latex to a level above the first pK$_a$ of a polyprotic acid (such as phosphoethyl methacrylate) or above the pK$_a$ of a monoprotic acid (such as sodium styrene sulfonate, and acrylamido-methyl-propane sulfonate). If the pH is too low, acid catalyzed oxirane ring opening can occur—at higher pH, such a mechanism is not available and the conjugate base is non-nucleophilic under heat-age conditions.

The concentration of anti-agglomerating functional groups in the polymer is sufficient to stabilize the thermoplastic polymer under heat-age conditions, preferably from 0.5, and more preferably from 1, to preferably 10, and more preferably to 5 weight percent, based on the weight of the polymer. Preferably, the concentration of carboxylic acid groups can be up to 20 weight percent based on the weight of the polymer, more preferably from 0.1 to 5 weight percent.

In another aspect of the present invention, the latex is an acrylic latex containing structural units of anti-agglomerating functional groups. Monomers suitable for the preparation of acrylic latexes include acrylates and methacrylates such as methyl acrylate, ethyl acrylate, butyl acrylate, 2-ethylhexyl acrylate, methyl methacrylate, ethyl methacrylate, butyl methacrylate, and 2-ethylhexyl methacrylate, and combinations thereof. It may be advantageous to include chain transfer agents in the latex preparation. Examples of chain transfer agents include, but are not limited to, dodecylmercaptan, butylmercaptopropionate, methylmercaptopropionate, mercaptopropionic acid, etc.

As mentioned previously, structural units of one or more acid monomers may also be included, most notably acrylic acid, methacrylic acid, and itaconic acid. Furthermore, the acrylic latexes may also include structural units of other monomers such as styrene and acrylonitrile, as well as monomers capable of imparting co-curable functionality such as glycidyl acrylates and methacrylates.

In certain embodiments it may be advantageous to incorporate into the polymer copolymerized multi-ethylenically unsaturated monomer groups. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene. It may be especially advantageous to incorporate such monomer groups non-uniformly into the polymer to form multiphase polymer particles to create a core-shell, hemispherical, or occluded morphology.

In certain embodiments, it may be beneficial to use multiphase polymer particles such as those disclosed by Duda et al. in *Langmuir* 2005, 21, 1096-1102. The preparation of these morphologies is well known in the art. A multi-stage emulsion polymerization process usually results in the formation of at least two mutually incompatible polymer compositions, thereby resulting in the formation of at least two phases. The mutual incompatibility of two or more polymer compositions and the resultant multiphase structure of the polymer particles may be determined in a variety of ways including scanning electron microscopy using staining techniques to emphasize the difference between the phases.

Multiphase polymer particles may be of various geometries including core/shell or core/sheath particles, core/shell particles with shell phases incompletely encapsulating the core, and core/shell particles with a multiplicity of cores. The final properties of these latexes are often achieved by balancing the monomer compositions of the individual phases and their relative proportions. For the present invention, it may be advantageous to use disparate or similar Tgs, and similar or disparate hydrophobicities. The end use application of the latex usually dictates the properties of each polymer phase.

The morphology of the host latex is not limited to strictly organic materials. It may be advantageous to make use of polymers that have embedded or adsorbed inorganic phases or domain; for example, the coatings composition may include polymer-encapsulated opacifying pigment particles comprising i) opacifying pigment particles, such as titanium dioxide particles, having a diameter in the range of 100 nm to 500 nm and an index of refraction of at least 1.8; ii) an encapsulating polymer, and iii) a polymeric dispersant for the encapsulated opacifying pigment particles and the polymer. Such polymer-encapsulated opacifying pigment particles are described, for example, in U.S. Patent Publication US 2010/0298483 A1. In another example, the coating composition may include polymer-encapsulated opacifying pigment particles as described in WO 2007/112503A1.

The imbibed latex is advantageously prepared separately from the thermosettable compound using conventional emulsion polymerization techniques, then combined with the thermosettable compound, which can be neat or in the form of an aqueous dispersion, preferably as an aqueous dispersion, more preferably as a micronized aqueous dispersion. When the thermosettable compound is added as an aqueous dispersion, the emulsion is stabilized with a stabilizing amount of a surfactant, preferably at a concentration in the range of about 0.5 to about 5% by weight. Nonionic surfactants are preferred, including APEO free, non-ionic wetting agents such as polyalkylene oxide block copolymers, polyoxyethylene glycol alkyl ethers, glucoside alkyl ethers, fatty acid esters, glycerol alkyl esters, sorbitan alkyl esters, and polyoxyethylene glycol alkylphenol ethers, including commercially available wetting agents such as TRITON X-405 Octylphenol Ethoxylate (A trademark of The Dow Chemical Company or its Affiliates). When the thermosettable compound is combined with the latex as a neat compound, imbibing is facilitated by agitation at or above room temperature.

High solids content imbibed latexes, that is, latexes with solids content of at least 40 weight percent and particularly in the range of 45-60 weight percent, based on the total weight of the latex, are achievable with the composition of the present invention. Moreover, these imbibed latexes, as distinct from those of the prior art, can be modified to include surprisingly high levels of the thermosettable compound, typically in the range of 20-60 weight percent or 30-50 weight percent, based on the weight of the thermoplastic particles and the thermosettable compound. These imbibed latexes can be prepared without solvents and therefore are capable of achieving a virtual absence of VOCs.

The imbibed latex composition is useful as one part of a two-pack formulation, the second part being a hardener (i.e., curing agent) that is added prior to use that causes the thermosettable compound to set. Accordingly, the imbibed latex composition of the present invention is substantially free of a hardener; that is, there is insufficient concentration of a compound that promotes oxirane ring opening to destabilize the thermosettable compound. Preferably, the imbibed latex composition contains not more than 0.05%, more preferably not more than 0.005%, and most preferably 0% of a hardener.

The imbibed latex compositions are cured with a water compatible external hardener. Examples of hardeners excluded from the composition include amines, amidoamines, hydrazine, anhydrides, isocyanates, phenolic resins, polyamides, and polymercaptans. The amount of hardener used generally varies from about 1:0.75 to 1:1.5 nucleophile equivalent (e.g. amine equivalent) to oxirane equivalent.

Examples of suitable hardeners include diethylenetriamine, triethylenetetramine, tetraethylene-pentamine, 2,2,4-trimethylhexamethylenediamine, 2,4,4-trimethylhexamethylenediamine, 1,6-hexanediamine, 1-ethyl-1,3-propanediamine, bis(3-aminopropyl)piperazine, N-aminoethylpiperazine, N,N-bis(3-aminopropyl)ethylenediamine, 2,4-toluenediamine, 2,6-toluenediamine, 1,2-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophorone-diamine, norboranediamine, 4,4'-diaminodicyclohexylmethane, 4,4'-diaminodicyclohexylmethane, 4,4'-diaminodicyclohexyl-propane, 2,2-bis(4-aminocyclohexyl)propane, 3,3'-dimethyl-4,4'-diaminodicyclohexylmethane, 3-amino-1-cyclohexane-amino-propane, 1,3- and 1,4-bis(aminomethyl)cyclohexane, m-xylylenediamine, p-xylylenediamine, polyoxypropylenediamines, polyamidoamines, and aminoplast resins formed by the reaction of ureas and melamines with aldehydes.

Commercial examples of water-compatible hardeners include Epi-cure 8535, 8536, 8537, 8290 and 8292 curing agents; Anquamine 401 curing agent; Casamid 360 and 362 curing agents; Epilink 381 curing agent, DP660 curing agent, Hardener HZ350, 92-113, and 92-116; Beckopox EH659W, EH623W, VEH2133W curing agents; and Epotuf 37-680 and 37-681 curing agents.

The imbibed latex composition can be cured over a wide temperature range for a time effective to cure the thermosettable resin. In another aspect the present invention is a method for forming a cured composite comprising the steps of a) contacting a composition containing the imbibed latex, such as a paint, with a hardener to form a curable composition b) applying the curable composition to a substrate; and c) curing the applied composition, wherein the steps a) and b) are sequential or concomitant. Concomitant addition can be conveniently carried out using dual nozzle spraying. Examples of substrates include metal, plastic, concrete, wood, asphalt, hair, paper, leather, rubber, foam, or textiles.

Particle size is in a range that provides a stable imbibed latex free of problems associated with sedimentation. The weight average particle size of the imbibed latex is dependent on the application on the concentration of imbibed thermosettable resin but is typically in the range of from 150 nm to 350 nm.

The coating composition according to the present invention may further include one or more of the following additives: Solvents; fillers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated titanium dioxide, zinc oxide, or lithopone; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

EXAMPLES

The following examples are for illustrative purposes only and are not intended to limit the scope of the invention.

| Abbreviations | | | |
|---|---|---|---|
| Butyl acrylate | BA | Styrenesulfonic acid, Na salt | SSS |
| 2-Ethylhexyl acrylate | EHA | Acetoacetoxyethyl methacrylate | AAEM |
| Methyl methacrylate | MMA | Acrylamide | AM |
| Methyl ethyl ketone | MEK | n-Dodecylmercaptan | nDDM |
| Acrylic Acid | AA | t-Butylhydroperoxide, 70% | tBHP |
| Ethyl hexyl acrylate | EHA | Isoascorbic Acid | IAA |
| Ethyl acrylate | EA | Sodium persulfate, 99% | NaPS |
| Isopropyl alcohol | IPA | Ammonium persulfate, 99% | APS |
| Methacrylic acid | MAA | Alkylpolyethoxysulfate, Na salt (31%) | Surfactant A |
| Phosphoethylmethacrylate | PEM | Ethylenediamine tetraacetic acid | EDTA |

Comparative Intermediate 1

Preparation of Latex with No Anti-Agglomerating Monomer

A monomer emulsion was prepared by mixing deionized water (521.8 g), Surfactant A (63.8 g), BA (957.6 g), MMA (919.3 g), and MAA (38.3 g) in a vessel. A separate flask was charged with deionized water (995 g) and then brought to 88° C. under a $N_2$ purge. The flask was charged with a solution of APS (2.9 g in 25 g of deionized water) and Polymer Seed A (53% EA/47% MMA, 45% solids content, 45 nm particle size, 29.5 g). The monomer emulsion was fed to the reactor at a rate of 12.5 g/min for 10 minutes, and then increased to 26.4 g/min for 100 minutes, maintaining a reactor temperature of 85° C. A mixture of 2.9 g of APS in 72.0 g of deionized water was added to the reactor at a rate of 0.75 g/min concurrently with the monomer emulsion feed.

After completion of addition, the monomer emulsion line was rinsed with deionized water (20 g) and the reactor was cooled to 80° C. At 80° C., a solution of iron sulfate heptahydrate (10 mg) in deionized water (10 g) was added, and then separate solutions of tBHP (1.2 g in 30 g deionized water) and IAA (0.9 g in 30 g of deionized water) were co-fed over 30 min The reactor was then cooled to 65° C., and a second redox pair was added to the latex over 30 min. The contents of the kettle were then cooled to 40° C., and a solution of KORDEK™ LX5000 biocide (a Trademark of The Dow Chemical Company or its Affiliates; 4.0 g in 10 g of water) were added, followed by a rinse with deionized water (50 g). The latex was passed through 100 and 325 mesh screens, and characterized for solids, pH and particle size (Table 1).

Latex polymer Intermediates 1-4 and Comparative Intermediate 2 were prepared using substantially the same procedure as detailed for Comparative Intermediate 1. The weights for the individual monomer used are detailed in Table 1. Weight average particle size was determined using light scattering.

TABLE 1

| Intermediate Latexes | | | | | | |
|---|---|---|---|---|---|---|
| | Comp Int. 1 | Comp. Int. 2 | Int. 1 | Int. 2 | Int. 3 | Int. 4 |
| DI Water (g) | 521.8 | 521.8 | 471.9 | 471.9 | 471.9 | 521.8 |
| Surfactant A (g) | 63.8 | 63.8 | 57.7 | 57.7 | 57.7 | 63.8 |
| BA (g) | 957.6 | 957.6 | 866.1 | 866.1 | 796.8 | 957.6 |
| MMA (g) | 919.3 | 919.3 | 831.5 | 831.5 | 848.8 | 896.3 |
| MAA (g) | 38.3 | | | | | |
| AA (g) | | 38.3 | | | | |
| SSS (g) | | | | 34.6 | | |
| AM (g) | | | 34.6 | | | |
| PEM (g) | | | | | | 61.3 |
| AAEM (g) | | | | | 86.6 | |
| Particle Size (nm) | 234 | 236 | 252 | 194 | 244 | 233 |
| Latex Solids | 50.5% | 50.3% | 50.4% | 50.2% | 49.1% | 50.3% |
| pH | 1.7 | 1.6 | 2.3 | 2.5 | 9.5 | 1.1 |

Comparative Examples 1-2 and Examples 1-4

Preparation of Latexes Imbibed with Epoxy Resin

The following procedure illustrates the process, and was used for all of the reported examples unless otherwise noted. DER-331 Liquid Epoxy Resin, deionized water, and TRITON™ X-405 Surfactant were mixed in a glass jar in amounts shown in Table 2. (For Example 4, pH of the latex was adjusted by the addition of ammonia solution prior to the addition of the epoxy resin). The mixtures were agitated for ~15 min with a magnetic stirrer, then homogenized for ~10 s using a Pro 250 handheld homogenizer (Pro Scientific, Inc.). The intermediate latexes (comparative intermediates 1 and 2 and intermediates 1 to 4) were then added over 2 min to the epoxy emulsions with stifling. The blends were agitated for 30 min, at which time more de-ionized water was added (110 g). Stirring was continued for 30 min and the samples were allowed to stand overnight.

An assessment was made regarding colloidal stability and phase separation of the epoxy resin (visible separation or not). Heat-age stability was determined by placing the sample in a 60° C. oven for ten days.

TABLE 2

Hybrid Binder Preparative Examples

|  | Comp Ex 1 | Comp Ex 2 | Ex. 1 | Ex. 2 | Ex. 3 | Ex. 4 |
|---|---|---|---|---|---|---|
| DI Water (g) | 221.7 | 218.6 | 125 | 116 | 140 | 145 |
| TRITON X-405 (g) | 29.3 | 28.9 | 25.8 | 25 | 28.3 | 22.2 |
| Epoxy Resin (g) | 203.6 | 206.5 | 176 | 175 | 198 | 145 |
| Latex ID | Comp Int. 1 | Comp Int. 2 | Int. 1 | Int. 2 | Int. 3 | Int. 4 |
| Latex mass (g) | 902 | 923.6 | 780 | 780 | 900 | 660 |
| pH | 1.7 | 1.6 | 2.3 | 2.5 | 9.5 | 3.9 |
| Size after DER | 256 | 255 | 255 | 194 | 251 | 255 |
| Size after heat-age | NA | NA | 253 | 195 | 258 | 256 |
| Comment | Solidified in oven | Solidified in oven | Pass | Pass | Pass | Pass |

(NA = not applicable)

As Table 2 shows, Comparative Examples 1 and 2 failed under heat-age stability conditions.

Examples 5-7

Preparation of PEM/MAA Latexes Imbibed with Epoxy Resin

A monomer emulsion mixture was prepared by mixing deionized water (570 g), Surfactant A (50.5 g), BA (1113.7 g), MMA (1042.5 g), PEM (17.8 g-71.3 g), MAA (0 g-53.5 g), nDDM (21.2 g) and Dequest 2016 chelant (0.34 g) in a vessel. A flask was charged with deionized water (960 g) and Surfactant A (2.2 g) and then heated to 83° C. under a $N_2$ purge. The flask was charged with a mixture of APS (5.5 g) in deionized water and a portion of the monomer emulsion mixture (137.5 g). After 10 min, the contents of the flask were fed into a reactor at a rate of 17.1 g/min over 20 min with concomitant addition of a solution of APS (2.35 g) in deionized water (98 g) at a rate of 0.63 g/min; the feed rates were then increased to 39.83 g/min and 1.46 g/min, respectively, over 60 min, maintaining a reactor temperature of 85° C.

After completion of addition, the monomer emulsion line was rinsed with deionized water (60 g) and the reactor cooled to 80° C. Ammonium hydroxide (7.3 g) in deionized water (15 g) were added to the reactor, followed by addition of a solution of iron sulfate heptahydrate (15 mg) and EDTA (10 mg) in deionized water (11 g), then simultaneous addition of separate solutions of tBHP (1.95 g) in deionized water (15 g) and IAA (1.3 g) in deionized water (15 g). The reactor was cooled to 75° C., and a second redox pair was added to the mixture over 30 min. The contents of the reactor were cooled to 50° C., and a solution of ammonium hydroxide (42 g) in deionized water (30 g) was fed over 10 min into the mixture, followed by a rinse with deionized water (20 g). The reactor was then cooled to room temperature and a solution of ROCIMA™ BT 2S biocide (a Trademark of The Dow Chemical Company or its Affiliates) 10.58 g) in water (12.5 g) was added, followed by a rinse with deionized water (10 g). The resultant latex was passed through 100 and 325 mesh screens, and characterized for solids, pH and particle size. The latex was then combined with D.E.R.™ 331 Liquid Epoxy Resin and subjected to heat-age stability studies as described above.

As illustrated in Table 3, all the samples were stable to separation and were heat-age stable, even with relatively high amounts of MAA.

TABLE 3

PEM and PEM/MAA Latexes Imbibed with Epoxy Resin

|  | Ex. 5 | Ex 6 | Ex. 7 |
|---|---|---|---|
| DI Water (g) | 570 | 570 | 570 |
| Surfactant A (g) | 50.5 | 50.5 | 50.5 |
| BA (g) | 1113.7 | 1113.7 | 1113.7 |
| MMA (g) | 1042.5 | 1042.5 | 1042.5 |
| MAA (g) | 0 | 17.8 | 53.5 |
| PEM (g) | 71.3 | 53.5 | 17.8 |
| Final neutralized amount (g) | 42 | 42 | 0 |
| Particle Size (nm) | 160 | 154 | 151 |
| Solids | 50.5% | 50.2% | 50.8% |
| pH | 9.0 | 9.3 | 4.5 |
| Size after DER (nm) | 169 | 161 | 162 |
| Size after heat-age (nm) | 169 | 167 | 182 |

Intermediate 5

A flask was charged with deionized water (1085 g) and Surfactant A (18.5 g) then heated to 87° C. under a $N_2$ purge. The flask was further charged with a solution of APS (2.9 g) in deionized water (25 g) and Polymer Seed A (29.5 g), followed by a water rinse (10.6 g). A monomer emulsion mixture prepared by mixing deionized water (521.8 g), Surfactant A (45.3 g), BA (957.6 g), MMA (900.2 g), MAA (38.3 g), AM (19.1 g), and nDDM (9.6 g) in a vessel was fed to the flask at a rate of 12 g/min minutes while a solution of APS (2.9 g) in deionized water (72 g) was added at a rate of 0.74 g/min. After 10 min, the monomer emulsion feed rate was increased to 25 g/min for 90 min, maintaining a reactor temperature of 85° C.

After completion of addition, the monomer emulsion line was rinsed with deionized water (25 g) and the reactor was cooled to 70° C. A solution of iron sulfate heptahydrate (10 mg) in deionized water (10 g) was then added to the reactor, followed by concomitant addition of a solution of tBHP (1.2 g) and APS (1.2 g) in deionized water (30 g) and a solution NaBS (1.2 g) in deionized water (30 g) over 30 min. The reactor was then cooled to 60 C, and a solution of tBHP (1.20 g) in deionized water (30 mL) and a solution of NaPS (1.3 g) in deionized water (30 g) were simultaneously co-fed over 30 min. The contents of the reactor were then cooled to room temperature, and a solution of KORDEK™ LX5000 biocide (a Trademark of The Dow Chemical Company or its Affiliates) (4 g) in deionized water (15 g) were fed over 10 min to the emulsion, followed by a 5 g rinse. The latex was passed through 100 and 325 mesh screens, and characterized having 50.8% solids, pH=1.9, and 230 nm particle size.

Example 8

Preparation of AM/MAA Latex Imbibed with D.E.R.™ 331 Liquid Epoxy Resin

A 5-L, four-necked flask equipped with a mechanical stirrer, $N_2$ inlet, and condenser, was charged with D.E.R.™ (165 g), TRITON X-405 surfactant (23.8 g) and deionized water (159.3 g). The mixture was agitated for 15 min, then heated to 60° C. Intermediate 5 (734.2 g) was added to the flask, and the temperature held at 50° C. for 1 h. The mixture was cooled to room temperature, and allowed to stand overnight prior to heat aging. A small amount of the liquid epoxy resin was observed to have phase separated to the bottom of the jar. The final sample was determined to have 50.2% solids, and pH=5.6.

Examples 9-11 were prepared using substantially the same procedure as described in Example 8 except where noted in Table 4. Table 4 illustrates that heat-age stable latexes can be prepared with combinations of AM and MAA at widely different pH values.

TABLE 4

AM/MAA Latexes Imbibed with Epoxy Resin

|  | Ex. 8 | Ex. 9 | Ex. 10 | Ex. 11 |
|---|---|---|---|---|
| DI Water (g) | 186.3 | 186.3 | 50.0 | 34.8 |
| TRITON X-405 (g) | 23.8 | 23.8 | 23.8 | 16.6 |
| Epoxy Resin (g) | 165 | 165 | 165 | 115 |
| Latex | Int. 6 | Int. 6 | Int. 6 | Int. 6 |
| Latex mass (g) | 735.8 | 735.8 | 735.8 | 512.8 |
| Stable to separation? | Yes | Yes | Yes | Yes |
| pH | 9.2 | 2.5 | 2.4 | 9.2 |
| Particle size after epoxy resin (nm) | 282 | 277 | 285 | 279 |
| Particle size after heat-age (nm) | 268 | 265 | 273 | 268 |
| Comment | Pass | Pass | Pass | Pass |

Example 12

Preparation of EHA/MAA Latex Imbibed with D.E.R.™ 331 Liquid Epoxy Resin

A monomer emulsion was prepared by mixing deionized water (800 g), Surfactant A (43.6 g), EHA (477.3 g), MMA (758.2 g), styrene (462.5), AAEM (92.5) and PEM (59.2 g), in a vessel. A separate flask was charged with deionized water (600 g) and Surfactant A (0.9 g) and then brought to 87° C. under a $N_2$ purge. The flask was charged with a mixture of APS (5.8 g) in 50 g of deionized water and a portion of the monomer emulsion mixture (60.0 g). After 10 min, the contents of the flask were fed into a reactor at a rate of 12.1 g/min over 10 min with concomitant addition of a solution of APS (2.5 g) in deionized water (125 g) at a rate of 0.54 g/min; the feed rates were then increased to 24.2 g/min and 1.09 g/min, respectively, and continued for 100 min, maintaining a reactor temperature of 86° C.

After completion of addition the monomer emulsion line was rinsed with deionized water (40 g), and the contents of the flask were held at 86° C. for 15 min, and the reactor cooled to 80° C. Ammonium hydroxide (20 g) was added to the reactor, followed by addition of a solution of iron sulfate heptahydrate (18 mg) and EDTA (19 mg) in deionized water (14 g), then addition of a solution of tBHP (1.3 g) in deionized water (15 g); then, a solution of IAA (0.9 g) in deionized water (20 g) was fed over 15 min. The reactor was cooled to 65° C., and a second redox pair (0.8 g of tBHP in 10 g deionized water, 0.56 g IAA in 10 g of deionized water) was added all at once, and the vessel held at 65° C. for 15 min. The contents of the reactor were cooled to 45° C., and a solution of ammonium hydroxide (32 g) was fed over 5 min into the mixture, followed by a rinse with deionized water (5 g). The reactor was then cooled to room temperature and 40 g of deionized water added The resultant latex was passed through 100 and 325 mesh screens, and characterized for solids content (49.8%), pH (9), and particle size (178 nm). The latex was then combined with D.E.R.™ 331 Liquid Epoxy Resin and subjected to heat-age stability studies as described above in Examples 1-4, achieving a final solids of 48.8%.

Example 13

Preparation of Core-shell Latex with glycidyl methacrylate and Imbibed with D.E.R.™ 331 Liquid Epoxy Resin A first monomer emulsion was prepared by mixing deionized water (244 g), Surfactant A (20 g), BMA (206.3 g), MMA (585.8 g), and glycidyl methacrylate (33.0 g), in a vessel. A second monomer emulsion was prepared by mixing deionized water (245.3 g), Surfactant A (20.0 g), BA (453.8 g), MMA (344.9 g) and PEM (15.8 g). A separate flask was charged with deionized water (691.2 g) and then brought to 87° C. under a $N_2$ purge. The flask was charged with a mixture of APS (5.2 g) in 44.6 g of deionized water and Polymer Seed A (87.5 g). The first monomer emulsion was fed into a reactor at a rate of 13.6 g/min over 10 min with concomitant addition of a solution of APS (2.2 g) in deionized water (40.1 g) at a rate of 0.53 g/min; the feed rates were then increased to 27.2 g/min and 1.06 g/min, respectively, and continued for 45 min, maintaining a reactor temperature of 86° C.

After completion of the addition of the first monomer emulsion, the tank and line were rinsed with deionized water (17.8 g), and the contents of the flask were held at 86° C. for 15 min. At the end of this hold period, 10 g of ammonium hydroxide solution (30%) were added to the reactor. The second monomer emulsion was then fed into the reactor at a rate of 24.2 g/min with concomitant addition of a solution of APS (2.1 g) in deionized water (40.1 g) at a rate of 0.9 g/min. At the completion of addition of the second monomer emulsion, the line was rinsed with 35.7 g of deionized water, and the temperature held at 86° C. for 15 min. The reactor was cooled to 80° C., and a solution of iron sulfate heptahydrate (17 mg) and EDTA (17 mg) in deionized water (13 g) was added, followed by addition of a solution of tBHP (1.2 g) in deionized water (15 g); then, a solution of IAA (0.8 g) in deionized water (20 g) was fed over 15 min. The reactor was cooled to 65° C., and a second redox pair (0.7 g of tBHP in 13 g deionized water, 0.5 g IAA in 13 g of deionized water) was added all at once, and the vessel held at 65° C. for 10 min. The contents of the reactor were cooled to 45° C., and a solution of Kathon LX™ (7.0 g in 21 g of deionized water) was fed over 5 min into the mixture, followed by a rinse with deionized water (5 g). The reactor was then cooled to room temperature and deionized water (36 g) was added The resultant latex was passed through 100 and 325 mesh screens, and characterized for solids content (51%), pH (6.4), and particle size (184 nm).

The latex (1100 g) was placed in a reactor, and heated to 60° C., and was then combined with D.E.R.™ 331 Liquid Epoxy Resin (251 g) homogenized with Disponil AFX-4070 emulsifier (36 g) and deionized water (96 g), followed by a rinse of deionized water (193 g). The contents of the reactor were held at 50° C. for one h, and then cooled to room temperature. The composite particle had a solids content of 49.9%, and a particle size of 196 nm A sample was placed in a 60° C. oven for 10 days. The particle size was remeasured (198 nm), confirming stability.

Example 14

Application of Latexes Imbibed with Epoxy Resin in Metal Coatings

The two-component (2k) formulation using the imbibed latex of Example 12 for direct-to-metal coatings is listed in Table 5. Part A was formulated using a bench top overhead mixer. The pH was adjusted with 14% ammonia water solution to 7-8.5. The viscosity was measured using a Stormer viscometer. Part B was formulated by grinding using a Cowles Dissolver. The Byk-019 defoamer and 35% Anquamine 401 curing agent were placed in a grind pot with agitation. Ti-Pure R-706 pigment was then added and the speed of the Cowles Dissolver increased to about 2500 RPM. After 25 min, a Hegman 7+ rating was observed at which additional curing agent was added, along with TERGITOL TMN-3 surfactant (a Trademark of The Dow Chemical Company or its Affiliates) and water. The blend was stirred for an additional 15 min. Part B was then added to Part A and the blend stirred for 15 min, at which time the pH and Stormer viscosity were measured for the final paint formulations.

TABLE 5

Paint Formulation of Latex Imbibed with Epoxy Resin

| | EX. 14 |
|---|---|
| Part A | |
| Ex. 12 Imbibed Latex (g) | 109.12 |
| Water (g) | 16.32 |
| Tego Airex 902W deaerator (g) | 0.88 |
| ACRYSOL ™ RM-8W rheology modifier (g) | 0.80 |
| Total A (g) | 127.12 |
| pH | 8.40 |
| Stormer viscosity (KU units) | 64.00 |
| Part B | |
| Byk-019 defoamer (g) | 0.40 |
| Anquamine 401 curing agent (35%) (g) | 25.00 |
| Ti-Pure R-706 (g) | 47.90 |
| Anquamine 401 curing agent (35%) (g) | 5.72 |
| Tergitol TMN-3 surfactant (g) | 2.12 |
| Water (g) | 3.36 |
| Final Grind | 84.48 |
| Total B | 84.78 |
| After addition of B to A | |
| Stormer viscosity (KU units) | 57.00 |
| pH | 9.48 |

The gloss, hardness, and impact resistance properties of Example 14 are listed in Table 6. Gloss was determined in accordance with test method ASTM D-523-89 (re-approved 1999). The above formulation was applied to treated aluminum panels at a wet film thickness of 10 mils, in accordance with test method ASTM D-823-95, procedure E to give a dry film thickness of about 2 mils Gloss at 20, 60 and 85 degrees was measured after 1 week drying/curing of the coatings at ambient temperature and 50% relative humidity. Pendulum (Koenig) Hardness was tested on the same panels using test method ASTM D4366-95 with Amplitude limit, 6° to 3° and period of oscillation, 1.4 s. Pencil hardness was determined using test method ASTM D3363-05 with the same panels as for the gloss measurement but after 2 weeks of curing/drying at ambient temperature and 50% relative humidity.

TABLE 6

Gloss, Hardness, and Impact Resistance of EX. 14

| | Ex. 14 |
|---|---|
| Gloss (1 week dry) | |
| 20° Gloss | 60 |
| 60° Gloss | 86 |
| 85° Gloss | 97 |
| Koenig Hardness (1 week dry) | 75.2 |
| Pencil Hardness (2 weeks dry) | HB |

Chemical resistance (spot test) was measured on draw downs made on treated aluminum panels as in the gloss measurements after 1 week drying/curing of the coatings at ambient temperature and 50% relative humidity. The test was done as follows: Round fiber disks were soaked with 10 different chemicals and placed on the coating and covered with lids. After ~1 h, the caps and disks were removed and the panels wiped lightly with a wipe. The coatings were rated for film damage using the following scale, 5=no damage, 4=slight swelling, blistering or wrinkling, dulling, yellowing, 3=moderate swelling, blistering or wrinkling, 2=severe swelling, blistering or wrinkling and 1=dissolved, delaminated. The ratings for both individual chemicals and the average are listed in Table 7.

TABLE 7

Chemical Resistance and MEK Double Rubs

| | EX. 14 |
|---|---|
| 10% HCl | 1 |
| 10% $H_2SO_4$ | 1 |
| 10% NaOH | 4 |
| 28% Ammonia | 3 |
| MEK | 4 |
| Gasoline | 3 |
| Brake Fluid | 5 |
| Water | 5 |
| 60% Ethanol | 4 |
| IPA | 4 |
| Average: | 4.0 |

Corrosion resistance was tested by exposing panels to a salt spray environment (5% sodium chloride fog) in accordance with test method ASTM B-117-97. Panels were prepared by drawing down the paints on 10-cm×30-cm (4"×12") sand blasted hot-rolled and cold-rolled steel panels and drying for two weeks at 24° C. (75° F.)/50% relative humidity to yield a final dry film thickness of $5 \times 10^{-3}$ cm (2 mil). Exposed metal was covered with tape (3M plastic tape #471) prior to exposure. A scribe mark was scratched into the bottom half of the panel immediately before exposure. Panels were removed periodically to rate rust and blistering. Blister ratings were conducted in accordance with test method ASTM D714-87 (re-approved 1994) and assigned a number and one or more letters. The number refers to the size of the blister, with 1 being the largest size. The letter is a qualitative representation of the density, with "D" referring to dense, "VD" referring to very dense, and "M" referring to medium. Rust ratings are shown as a percentage of rust on a panel. The blister size, rust percentage and the width of the rusted scribes are listed in Table 8.

TABLE 8

Corrosion Resistance, Salt Spray Test for Example 14

| | Ex. 14 |
|---|---|
| Substrate = CRS | |
| 24 h | |
| blisters | none |
| rust | none |
| scribe | Fine |
| 167 h | |
| blisters | #8 M, #9 D |
| rust | 10% |
| scribe | 1-2 mm |
| 336 h | |
| blisters | #8 VD, #9 D |
| rust | 15% |
| scribe | 1-2 mm |
| Substrate = HRS | |
| 24 h | |
| blisters | none |
| rust | 5% |
| scribe | fine |
| 167 h | |
| blisters | #9 D |
| rust | 15% |
| scribe | 1-2 mm |
| 336 h | |
| blisters | #8 D, #9 VD |
| rust | 20% |
| scribe | 2-3 mm |

The invention claimed is:

1. A composition comprising a stable aqueous dispersion of thermoplastic polymer particles imbibed with a thermosettable compound having at least two oxirane groups, which polymer particles are characterized by having a sufficient concentration of anti-agglomerating functional groups to stabilize the latex against agglomeration, wherein the composition contains a substantial absence of a hardener wherein the weight average particle size of the polymer particles is in the range of 150 nm to 350 nm.

2. The composition of claim 1 wherein the thermoplastic polymer particles are acrylic-based polymer particles and the concentration of the thermosettable compound is from 20% to 60 weight %, based on the total weight of the thermoplastic polymer particles and the thermosettable compound, wherein the composition contains no hardener.

3. The composition of either of claim 2 wherein a) the thermosettable compound is a diglycidyl ether of bisphenol A, the diglycidyl ether of bisphenol F, 1,4-butanediol diglycidyl ether, 1,6-hexanediol diglycidyl ether, the diglycidyl ester of phthalic acid, 1,4-cyclohexanedmethanol diglycidyl ether, 1,3-cyclohexanedmethanol diglycidyl ether, the diglycidyl ester of hexahydrophthalic acid, or a novolac resin, or a combination thereof; and b) the anti-agglomerating functional groups are functional groups of acrylamide; acetoacetoxyethyl methacrylate; acetoacetoxyethyl methacrylate enamine; sodium p-styrene sulfonate; 2-acrylamido-2-methylpropane sulfonic acid or a salt thereof; or phosphoethymethacrylate or a salt thereof, or a combination thereof; and c) the concentration of the thermosettable compound is from 30% to 50 weight %, based on the total weight of the thermoplastic polymer particles and the thermosettable compound.

4. The composition of claim 3 wherein the concentration of anti-agglomerating functional groups is from 0.5 to 10 weight percent, based on the weight of the polymer particles.

5. The composition of claim 4 wherein the thermoplastic polymer particles further includes 0.1 to 5 weight percent carboxylic acid groups or salts thereof, based on the weight of the polymer.

6. A method for forming a cured composite comprising the steps of a) contacting the composition of claim 1 with a hardener to form a curable composition b) applying the curable composition to a substrate; and c) curing the applied composition, wherein the steps a) and b) are sequential or concomitant.

7. The method of claim 6 wherein the substrate is metal, plastic, concrete, wood, asphalt, hair, paper, leather, rubber, foam, or textiles.

8. The method of claim 6 wherein the cured composite forms a coating, an adhesive, a sealant, a primer, a caulk, a filler, which cured composite contains a substantial absence of volatile organic compounds.

9. A method comprising the steps of:
a) polymerizing an aqueous dispersion of an ethylenically unsaturated monomer containing anti-agglomerating groups under conditions sufficient to form a stable aqueous dispersion of an anti-agglomerating group functionalized polymer; and
b) mixing the anti-agglomerating group functionalized polymer with a thermosettable compound having at least two oxirane groups to form a stable aqueous dispersion of imbibed polymer particles having a weight average particle size in the range of 50 to 400 nm which is heat-age stable at 60° C. for 10 days.

10. The method of claim 9 wherein:
a) the thermosettable compound is mixed as an aqueous dispersion and is a diglycidyl ether of bisphenol A, the diglycidyl ether of bisphenol F, 1,4-butanediol diglycidyl ether, 1,6-hexanediol diglycidyl ether, the diglycidyl ester of phthalic acid, the diglycidyl ester of hexahydrophthalic acid, or a novolac resin;
b) the anti-agglomerating functional groups are functional groups of acrylamide; acetoacetoxyethyl methacrylate; acetoacetoxyethyl methacrylate enamine; sodium p-styrene sulfonate; 2-acrylamido-2-methylpropane sulfonic acid or a salt thereof; or phosphoethymethacrylate or a salt thereof, or a combination thereof;
c) the concentration of the thermosettable compound is from 30% to 50 weight %, based on the total weight of the thermoplastic polymer particles and the thermosettable compound;
d) the particle size of the stable aqueous dispersion of imbibed polymer particles having a weight average particle size in the range of 150 to 350 nm; and
e) the concentration of anti-agglomerating functional groups is from 0.5 to 10 weight percent, based on the weight of the polymer particles.

11. The method of claim 9 wherein the thermosettable compound is mixed as an micronized aqueous dispersion.

12. The composition of claim 1 which further includes polymer-encapsulated or partially encapsulated opacifying pigment particles.

13. A composition comprising a stable aqueous dispersion of acrylic-based polymer particles imbibed with a thermosettable compound having at least two oxirane groups, which acrylic-based polymer particles are characterized by having a sufficient concentration of anti-agglomerating functional groups to stabilize the latex against agglomeration;

wherein the composition contains a substantial absence of a hardener;

wherein the thermosettable compound is a diglycidyl ether of bisphenol A, the diglycidyl ether of bisphenol F, 1,4-butanediol diglycidyl ether, 1,6-hexanediol diglycidyl ether, the diglycidyl ester of phthalic acid, 1,4-cyclohexanedmethanol diglycidyl ether, 1,3-cyclohexanedmethanol diglycidyl ether, the diglycidyl ester of hexahydrophthalic acid, or a novolac resin, or a combination thereof, wherein the concentration of the thermosettable compound is from 30% to 50 weight %, based on the total weight of the acrylic-based polymer particles and the thermosettable compound;

wherein the anti-agglomerating functional groups are functional groups of acrylamide; acetoacetoxyethyl methacrylate; acetoacetoxyethyl methacrylate enamine; sodium p-styrene sulfonate; 2-acrylamido-2-methylpropane sulfonic acid or a salt thereof; or phosphoethymethacrylate or a salt thereof, or a combination thereof;

wherein the concentration of anti-agglomerating functional groups is from 0.5 to 10 weight percent, based on the weight of the acrylic-based polymer particles;

wherein the acrylic-based polymer particles further includes 0.1 to 5 weight percent carboxylic acid groups or salts thereof, based on the weight of the polymer; and wherein the weight average particle size of the polymer particles is in the range of 150 nm to 350 nm.

* * * * *